United States Patent [19]

Hiles

[11] 4,049,396

[45] Sept. 20, 1977

[54] MOLDED ABRASIVE ARTICLE COMPRISING NON-FOAMED, FRIABLE POLYURETHANE AND PROCESS

[75] Inventor: Maurice Arthur Frederick Hiles, Welwyn, England

[73] Assignee: National Research Development Corporation, London, England

[21] Appl. No.: 607,809

[22] Filed: Aug. 26, 1975

Related U.S. Application Data

[63] Continuation of Ser. No. 356,232, May 30, 1973, abandoned.

[51] Int. Cl.² .................................................. C09K 3/14
[52] U.S. Cl. ...................................... 51/295; 51/298 A
[58] Field of Search ........................... 51/295, 296, 298

[56] References Cited

U.S. PATENT DOCUMENTS

| | | | |
|---|---|---|---|
| 2,220,140 | 11/1940 | Bartling et al. | 51/295 |
| 2,712,987 | 7/1955 | Storrs et al. | 51/298 |
| 2,881,065 | 4/1959 | Reuter | 51/298 |
| 2,899,288 | 8/1959 | Barclay | 51/295 |
| 3,042,508 | 7/1962 | Haigis et al. | 51/295 |
| 3,252,775 | 5/1966 | Guilbert | 51/295 |
| 3,401,490 | 9/1968 | Mora | 51/295 |
| 3,402,034 | 9/1968 | Schnabel | 51/295 |
| 3,813,231 | 5/1974 | Gilbert et al. | 51/295 |
| 3,850,589 | 11/1974 | Charvat | 51/295 |

*Primary Examiner*—Donald J. Arnold
*Attorney, Agent, or Firm*—Finnegan, Henderson, Farabow & Garrett

[57] ABSTRACT

A friction or abrasive composition comprises a dispersion of friction or abrasive particles in a polymeric substrate which becomes friable at a temperature below its softening point.

29 Claims, No Drawings

MOLDED ABRASIVE ARTICLE COMPRISING NON-FOAMED, FRIABLE POLYURETHANE AND PROCESS

This is a continuation, of application Ser. No. 365,232, filed May 30, 1973 and now abandoned.

This invention relates to friction or abrasive compositions, and more particularly to compositions comprising a suspension of friction or abrasive particles in a polymeric substrate.

It is known to incorporate abrasive particles in a polymeric substrate but such compositions as have been proposed have been found to be unsuitable for heavy duty applications, for example high speed abrasive wheels and discs, brake pads, and brake and clutch linings due to the clogging of the composition with particles of the workpiece with which it comes in contact. These particles adhere to the surface of the composition and reduce its frictional or abrasive properties. It has also been proposed to use a foamed polymer, as the polymeric substrate in an abrasive composition in order to minimise the problem of clogging, but such compositions have insufficient mechanical strength for the majority of applications.

Surprisingly it has now been found that a substantial reduction in clogging can be obtained whilst retaining the desired mechanical properties of the composition by using a polymeric substrate which becomes friable at a temperature below its softening temperature.

According to one aspect of the invention therefore, a friction or abrasive composition comprises a dispersion of friction or abrasive particles in a polymeric substrate that is a polyurethane which becomes friable at a temperature below its softening point.

The polyurethane substrate is one that becomes friable, that is to say, the polyurethane suffers a degradation such that its resistance to abrasion is reduced when heated to a temperature below its softening point. Simple tests on any individual polyurethane can be made to determine whether it will be suitable for use in the present invention. For example, a sample of the material may be heated until a gentle rubbing action enables particles to be dislodged from its surface. If the temperature at which this occurs is below the softening temperature of the material then the polyurethane is acceptable for use in the present invention. Alternatively the surface of the sample may be heated by frictional contact with a workpiece and the surface of the sample examined at regular intervals. If the sample is abraded to form a particulate or powdery deposit then it will be suitable for use in the present invention, but if the surface melts or softens then it will not.

For most applications elastomeric polyurethanes are preferred for greater toughness, and these may be generally flexible or resilient depending upon the application. Rigid polyurethanes may also be used in some circumstances for example in abrasive cones.

The physical properties of the polyurethane substrate will of course depend on the chosen application and should be arranged such that the polyurethane has a softening point higher than the intended working surface temperature of the composition. In this specification the softening point is defined as the softening point determined by the Kofler hot bar technique. Preferably the softening point of the polyurethane is greater than 150° C and most preferably in the range of from 200° to 300° C.

For abrasive compositions, and in particular for abrasive discs, rods, belts and other shapes, the polyurethane preferably has a tensile strength of 600 to 9000 pounds per square inch, an elongation to break of from 100 to 200% and a tear strength of from 50 to 200 pounds per linear inch (Graves Test). For friction compositions, for example for brake pads, the polyurethane preferably has a tensile strength of from 4000 to 16000 pounds per square inch, an elongation to break of from 10 to 100% and a tear strength of from 50 to 200 pounds per linear inch.

The composition may comprise a variety of friction or abrasive particles, but particularly preferred are those having a low oil absorbency. If the oil absorbence of the friction or abrasive particles is too high then it may not be possible to introduce sufficient friction or abrasive particles into the composition for certain applications. Preferred friction or abrasive particles include for example aluminium oxide, asbestos, boron carbide, various calcites, carborundum, glass, molybdenum disulphide, various silicates, silicon tungsten carbide, powdered or granulated carbon, carbon fibres, marble, quartz, or tungsten dioxide. The particle size of the friction or abrasive particles will depend upon the application but will usually be from 24 to 400 BSS mesh.

Preferably the friction or abrasive composition contains at least 10% by weight of abrasive particles, and most preferably from 15% to 90% by weight of abrasive particles based on the total weight of the composition.

According to another aspect, the invention also includes a process for the production of a friction or abrasive composition which comprises placing in a mould a polymerisable mixture of a polyol and a diisocyanate together with friction or abrasive particles and vibrating the mixture so as to disperse the abrasive particles in the mixture whilst the polymerisation proceeds, the polyol and the diisocyanate together forming a polyurethane which becomes friable at a temperature below its softening point.

The polyurethane may be formed by reacting a polyol, and particularly a polyether or polyester polyol with a diisocyanate, and may be produced by a one-shot or prepolymer technique. Very good results have been obtained using polyols sold by Bostik Ltd. under the trade names PM117X and PM260X. These are believed to be polyoxyalkyleneglycols, and have a molecular weight of 1100 to 1300 and a hydroxyl number of from 120 to 140.

The diisocyanate is preferably an aryl diisocyanate, for example toluene diisocyanate, 4,4'-diphenylmethane diisocyanate, and 1,5-naphthylene diisocyanate. In order to obtain the desired mechanical properties it is sometimes preferred to introduce a degree of cross-linking into the polyurethane, for example a molecular weight per branch point of from 2000 to 22000. Excellent results have been obtained using polyurethanes made from polyols sold by Bostik Ltd. under the trade names PM 117X, and PM 260X, and 4,4'-diphenylmethane diisocyanate.

Although the invention is not limited to any particular theory, it is believed that as an abrasive particle on the surface of the composition becomes dulled during use the substrate adjacent to the particle comes in contact with the workpiece causing its temperature to rise, until a temperature is reached at which the substrate around the particle fractures and the particle is torn loose from the substrate. This action then exposes further abrasive particles which are available to do useful work. The removal of dulled abrasive particles before the temperature of the substrate can rise sufficiently to cause softening or melting is an important aspect of this invention.

The working surface temperature of the composition will of course vary depending upon the application. In the case of an abrasive composition used in an abrasive disc rotated by a power tool, the surface temperature will depend on the speed of rotation of the disc, the pressure applied, and the type of material to be abraded. Similarly the maximum working surface temperature of friction material used for example as brake shoes or linings for a vehicle will depend on the weight and maximum speed of the vehicle. The local working surface temperature adjacent to a dulled friction or abrasive particle should be sufficient to cause breakdown of the bond between the polyurethane substrate and the particles so that the particle can be released, but the substrate should be sufficiently heat resistant not to release particles which can still do useful work.

It has been found that the heat resistance of the polyurethane substrate can be substantially improved by the addition of a compound which decreases the thermal conductivity of the substrate, thus it is believed, confining the heat to the surface of the composition where it is dissipated by abrasion. A further improvement may be obtained by the addition of a compound which increases the modulus (defined as the ratio of stress to strain) of the composition.

It has been found that the thermal conductivity of the substrate may be decreased and the modulus increased by the addition of a multivalent metal borate. Accordingly, in another aspect the invention comprises a friction or abrasive composition comprising abrasive particles dispersed in a polymeric substrate, and including a particulate multivalent metal borate in an amount sufficient to increase the working temperature of the composition.

Preferred multivalent metal borates are those of divalent metals, particularly metals of Group II of the Periodic Table, and especially the borates of zinc and calcium. Borates having a low oil absorbency are particularly preferred, and especially good results have been obtained with zinc borate. The amount of multivalent metal borate added to the composition is usually at least 5% by weight, based on the weight of the polymeric substrate, in order to have an appreciable effect, but it is not usually necessary to add more than 25% by weight. In some circumstances, it may be possible to use the multivalent metal borate in a suitable particle size as part of, or even the whole of, the friction or abrasive particles.

An alternative, or additional, method of improving the heat resistance of the composition is by adding polytetrafluoroethylene (P.T.F.E.) for example in a proportion of from 0.5 to 20% by weight, based on the total weight of the composition, to the substrate. This reduces the friction at the working surface and hence the working surface temperature. A suitable P.T.F.E. particle size is about 15μ.

In another of its aspects, the invention provides a method of using the friction or abrasive composition by applying a working surface thereof to another surface so that, for at least a portion of the period of operation, the working surface reaches a temperature at which the substrate becomes friable. In the preferred compositions, the temperature at which the substrate becomes friable is around 150° C. The temperature at which the substrate becomes friable may however be as low as 110° C, or as high as 250°.

In the production of articles comprising a composition according to the invention, the components of the polyurethane, that is to say, the polyol and the diisocyanate are preferably first placed in a mould usually at room temperature, and the friction or abrasive particles added subsequently. In order to obtain a good dispersion of the particles it is preferable that the mixture of polyol and diisocyanate should have a viscosity of less than 150 poise, and most preferably less than 40 poise. The composition is then vibrated to disperse the friction or abrasive particles, and this may conveniently be done by vibrating the mould. Preferably the vibration is of the order 30 to 150 Hertz using a force of 1 to 10G. For friction compositions, for example brake pads, the vibration should preferably be sufficient to distribute the friction particles uniformly through the composition. However, for abrasive compositions it may sometimes be desirable to arrange that the particles are distributed only in a surface layer. The mixture has usually solidified in from 4 to 30 minutes depending on the temperature and the curing system used. In preparing compositions according to the invention it is important that air and water should be kept out of the mould. Excellent results may be obtained using vacuum casting techniques. The partially cured moulding may then be stored, for example up to about 7 days to achieve a final cure.

The invention is illustrated by the following Examples:

EXAMPLE 1

An abrasive disc suitable for use on a pistol drill operating at about 2,400 revolutions per minute is composed as follows:

| Material | Parts by weight |
| --- | --- |
| Polyol (obtained from Bostik Ltd. under Compound No. P.M. 117X) | 70 |
| 4,4'-diphenylmethane diisocyanate | 20 |
| Abrasive 60 grit | 180 |

The abrasive grit is tungsten carbide though this may be replaced by silicon carbide or glass. The polyol is defined in the usual way by the physical properties of the polyurethane which is produced. In this case the polyurethane produced by the polyol has a hardness of 65 to 75 on the Shore "A" scale, a heat deflection temperature of 100° C, a tensile strength of 1,000 p.s.i. (A.S.T.M.D. 638-61 T) and an elongation at break of 110%. The material was moulded in the way outlined above in a mould to produce a one piece abrasive disc which was mounted on a pistol drill. The disc is used to abrade a 5 inch thick block of aluminium. After it has abraded the aluminium through, the disc is examined and no signs of clogging of the working surface of the disc is found, the disc being only slightly worn and being suitable for continued use.

EXAMPLE 2

A composition suitable for use at a higher speed than Example 1 is made from the following components.

| Material | Parts by weight |
|---|---|
| Polyol PM 117X | 70 |
| 4,4'-diphenylmethane diisocyanate | 20 |
| Abrasive 60 grit | 175 |
| Zinc borate | 10 |

An abrasive disc is made for this material in a similar way to Example 1 and tested at a higher speed up to 8000 revolutions per minute. By virtue of this increased speed it abrades more quickly than the abrasive disc of Example 1 but is otherwise equally effective.

EXAMPLE 3

A further increase in the speed of rotation of the abrasive disc is provided by a composition as follows:

| Material | Parts by weight |
|---|---|
| Polyol PM 117X | 70 |
| 4,4'-diphenylmethane diisocyanate | 20 |
| Abrasive 60 grit | 170 |
| Zinc borate | 10 |
| Polytetrafluorethylene | 5 |

Once again an abrasive disc is made of this material in the same way as Example 1. The abrasive disc is tested and found to be able to operate at a higher speed than Example 1 or Example 2 (up to 18,000 revolutions per minute).

EXAMPLE 4

Brake pads suitable for use in disc brakes on a motor car are moulded in one piece from a composition having the following components:

| Material | Parts by weight |
|---|---|
| Polyol (P.M. 117X) | 17.5 |
| Polyol (rigid supplied by Bostik Ltd. under Compound No. GA 174) | 17.5 |
| 4,4'-diphenylmethane diisocyanate | 10 |
| Zinc borate | 9 |
| Calcium Carbonate in the form of precipitated marble (grit size 60–100 mesh) | 50 |

The polyol used produces a polyurethane having the following physical characteristics.

The polyurethane has a hardness of 80 on the Shore "D" scale, a heat deflection temperature of 60° C, a tensile strength of 4,000 to 5,500 p.s.i., a flexural modulus of 5,500 p.s.i. (A.S.T.M.D. 790-61 T) and a tangent modulus of 180,000 p.s.i. This material is substantially rigid and only slightly resilient. Brake pads made in accordance with this are tested on disc brakes of a motor car. It is found that the brakes are satisfactory in as much as they stop a motor car at least as quickly as conventional brake pads. By virtue of their substantially homogeneous form no scoring of the brake disc takes place, and by virtue of their slight resilience application of the brakes is smoother. Tests have indicated that the brake pads made in accordance with this material wear only slowly.

EXAMPLE 5

This example describes the production of an abrasive disc comprising a composition according to the invention.

105 parts by weight of a liquid polyol (sold by Bostik Ltd. under the trade name PM 260X) and 30 parts by weight of 4,4'-diphenylmethane diisocyanate are poured into a mould. There is then added 135 parts by weight of abrasive 36 grit and the mould vibrated at 30 Hertz using a force of 5G for 15 seconds. There is produced a moulded abrasive disc having excellent abrasion properties. The polyurethane substrate has a tensile strength of 824 p.s.i. an elongation at break of 190% and a tear strength of 122 lbs per linear inch.

EXAMPLE 6

This Example described a comparison between the disc of Example 5 and discs made using other polymerisable resins. The procedure of Example 5 is repeated using other polymerisable resin systems containing the same quantity of abrasion. The resultant discs are then compared in abrasion effectiveness with the disc of Example 5. The comparison is carried out by rotating each disc at a speed of 2400 rpm on a test rig and a force of 2kg applied to a reciprocating aluminium workpiece at an angle of 10° for a period of 15 minutes. The results are given in the following Table:

| | | ABRASION TEST | | |
|---|---|---|---|---|
| Resin | Clogging | abrasion resistance | % weight loss of disc | % workpiece abraded |
| Epoxide | high | low | 21 | 6 |
| Phenolic | medium | medium | 29 | 5 |
| Polyester | high | low | 47 | 1 |
| Disc ex 5 | low | high | 3 | 12 |

From these results it can be seen that only a polyurethane which becomes friable at a temperature below its softening point has the combination of properties necessary to achieve continuous abrasion. It is believed that this is because polyurethanes have a high abrasion resistance but a low abrasion temperature, a coefficient of friction greater than that of the friction or abrasive particles, and sufficient adhesion to hold friction or abrasive particles firmly. These properties, coupled with the ability to release worn particles when they have ceased to do useful work, by abrasion of the polyurethane without substantial softening or melting, contribute to the improvement obtained with the compositions of the invention.

EXAMPLE 7

This Example describes a comparison between zinc borate and other inorganic additives in their ability to increase the working temperature of an abrasive composition according to the invention.

A series of abrasive discs are prepared according to the procedure of Example 5 except that to each composition there is added 20% of an inorganic particulate additive. The heat conductivity through the discs us then compared with a control containing no additive by placing the discs on a heated plate at 220° C for a stabilising period and then simultaneously measuring the temperature at their rear surface opposite to the heated plate. The results are given in the following Table:

| Additive | Rear surface temperature | REMARKS |
|---|---|---|
| NONE | 139° C | |
| boric acid | — | caused mixture to foam producing an unusable disc |
| borax | — | |
| zinc oxide | 139° C | |

-continued

| Additive | Rear surface temperature | REMARKS |
|---|---|---|
| magnesium oxide | 140° C | |
| calcium oxide | 138° C | |
| antimony trioxide | 139° C | |
| zinc borate | 110° C | |
| aluminium powder | 185° C | greatly reduced physical properties of composition. |

From these results it can be seen that zinc borate produces the only significant decrease in thermal conductivity.

Applications for compositions of the invention include abrasive pads, abrasive wheels, automatic transmission linings, brake pads, brake linings, clutch linings, non slip washers and similar inserts, polishing pads and wheels, spindle mounted polishing and abrasive devices for tubes and orifices and valve and valve seating and grinding devices. One of the advantages of the present composition is that many of these parts can be moulded in one piece whereas at present they are made of a plurality of pieces. For example, in the case of brake pads for disc brakes, at present these comprise a steel backing plate to provide rigidity and strength on which is adhered brake friction material. In the present instance the brake pads which have been tried under test are of a single piece construction having no backing plates. There is sufficient strength in the polyurethane substrate to dispense with the steel backing plate if desired.

Alternatively, however, they may be moulded together of different polyurethanes e.g. a rigid polyurethane backing with a less rigid polyurethane friction surface. Similarly, in the case of abrasive discs, in the past these have often comprised an abrasive material backed by separate rubber disc. In the present instance the abrasive composition is sufficiently rigid to provide its own backing material.

Articles incorporating the composition will normally be presented in a moulded form. The abrasive composition may also be provided for example in particulate form as abrasive media for use in tumbling and vibratory systems for example as abrasive cones for the deburring and polishing of metal, rubber, plastic and like products. In the latter applications it may be advantageous to use lightweight abrasive particles such as silicon microspheres.

As well as being useful in moulded form, the composition of the invention may be employed in sheet form. One particular useful application is in the form of washer shape pieces of thin sheet which may be used as an insert for the surface grinding of value seats and the like taking the place of repeated applications of grinding paste.

We claim:

1. A molded abrasive-containing article comprising a dispersion of abrasive particles in an unfoamed polyurethane substrate containing a multivalent metal borate, said substrate becoming friable at a temperature below its softening point.

2. A process for the production of a molded abrasivecontaining article which comprises placing in a mold a composition comprising (i) a polymerisable mixture of a polyol and a diisocyanate, (ii) a multivalent metal borate, and (iii) abrasive particles, vibrating the composition so as to disperse the abrasive particles in the mixture while the polymerization proceeds, and continuing the polymerization until there is formed an unfoamed polyurethane substrate containing the multivalent metal borate and a dispersion of the abrasive particles, said substrate becoming friable at a temperature below its softening point.

3. A molded article according to claim 1, in which the polyurethane is an elastomeric polyurethane.

4. A molded article according to claim 1, in which the softening point of the polyurethane substrate is from 200° to 300° C.

5. A molded article according to claim 1, in which the polyurethane substrate has a tensile strength of from 600 to 7000 lbs. per sq. in., an elongation to break of from 100 to 200% and a tear strength of from 50 to 200 lbs. per linear inch.

6. A molded article according to claim 1, in which the polyurethane substrate has a tensile strength of from 4000 to 16,000 lbs. per sq. in., an elongation to break of from 10 to 100% and a tear strength of from 50 to 200 lbs. per linear inch.

7. A molded article according to claim 1, in which the abrasive particles have a low oil absorbency.

8. A molded article according to claim 1, in which the abrasive particles are selected from aluminium oxide, asbestos, boron carbide, a calcite, silicon carbide, glass, molybdenum disulphide, a metal silicate, silicon carbide, tungsten carbide, a powdered or granulated carbon, carbon fibers, marble, quartz, and tungsten dioxide.

9. A molded article according to claim 1, in which the average particle size of the abrasive particles is from 36 to 400 BSS mesh.

10. A molded article according to claim 1, that contains from 15 to 90% by weight of abrasive particles based on the total weight of the dispersion.

11. A molded article according to claim 1, in which the polyurethane is cross linked and has a molecular weight per branch point of from 2000 to 22000.

12. A molded article according to claim 1, wherein the multivalent metal borate is zinc borate.

13. A molded article according to claim 1, in which the multivalent metal is a divalent metal of Group II of the Periodic Table.

14. A molded article according to claim 1, wherein the multivalent metal borate is calcium borate.

15. A molded article according to claim 1, that comprises 5 to 25% by weight of the multivalent metal borate based on the weight of the polyurethane.

16. A molded article according to claim 1, that includes particles of polytetrafluoroethylene.

17. A molded article according to claim 16, in which the polytetrafluoroethylene is present in a proportion of from 0.5 to 20% by weight based on the total weight of the dispersion.

18. A molded article according to claim 1, in which the temperature at which the polyurethane substrate becomes friable is from 110° to 150° C.

19. A process according to claim 2, in which the polyol is a linear polyether or polyester.

20. A process according to claim 2, in which the diisocyanate is an aryl diisocyanate.

21. A process according to claim 20, in which the diisocyanate is 4,4'-diphenylmethane diisocyanate.

22. A process according to claim 2, in which the multivalent metal borate is zinc borate.

23. A process according to claim 2, in which the multivalent metal is a divalent metal of Group II of the Periodic Table.

24. A process according to claim 2, in which the multivalent metal borate is calcium borate.

25. A process according to claim 2, in which the multivalent metal borate is added in an amount of from 5 to 25% by weight based on the weight of the polyurethane.

26. A process according to claim 2, in which there is added to the mixture polytetrafluorethylene.

27. A process according to claim 26, in which the polytetrafluorethylene is added in an amount of from 0.5 to 20% by weight based on the total weight of the composition.

28. A process according to claim 2, in which the mixture of the polyol and the diisocyanate has a viscosity of less than 40 poise.

29. A process according to claim 2, in which the composition is vibrated at from 30 to 150 Hertz using a force of from 1 to 10G.

* * * * *